(12) United States Patent
Shin

(10) Patent No.: US 7,658,990 B2
(45) Date of Patent: Feb. 9, 2010

(54) SUPER LIGHT WEIGHT CERAMIC PANEL AND PROCESS FOR PREPARING THE SAME

(75) Inventor: Sang-Ho Shin, Cheongju-si (KR)

(73) Assignee: LG Chem, Ltd. (KR)

( * ) Notice: Subject to any disclaimer, the term of this patent is extended or adjusted under 35 U.S.C. 154(b) by 142 days.

(21) Appl. No.: 10/563,028

(22) PCT Filed: Nov. 4, 2005

(86) PCT No.: PCT/KR2005/003701
§ 371 (c)(1),
(2), (4) Date: Dec. 30, 2005

(87) PCT Pub. No.: WO2006/049444
PCT Pub. Date: May 11, 2006

(65) Prior Publication Data
US 2007/0110989 A1    May 17, 2007

(30) Foreign Application Priority Data
Nov. 4, 2004    (KR) .................. 20-2004-0031164 U

(51) Int. Cl.
*B32B 3/26* (2006.01)
*C04B 38/10* (2006.01)

(52) U.S. Cl. .............. 428/313.7; 428/312.2; 428/312.6; 428/312.8; 428/314.4; 428/319.1; 501/80; 501/84; 501/39; 501/141

(58) Field of Classification Search .............. 428/312.2, 428/312.6, 312.8, 314.4, 319.1, 313.7; 501/80, 501/84, 39, 141, 144
See application file for complete search history.

(56) References Cited

U.S. PATENT DOCUMENTS

| | | | | |
|---|---|---|---|---|
| 3,666,506 A | * | 5/1972 | Cowan, Jr. et al. | 501/27 |
| 3,727,838 A | * | 4/1973 | Bergh | 238/152 |
| 3,762,935 A | * | 10/1973 | Leach | 501/84 |
| 3,942,990 A | * | 3/1976 | Engstrom et al. | 501/84 |
| 3,975,174 A | * | 8/1976 | Camerlinck | 65/22 |
| 4,017,289 A | * | 4/1977 | Hoda | 65/33.7 |
| 4,071,369 A | * | 1/1978 | Kurz et al. | 501/84 |

FOREIGN PATENT DOCUMENTS

| | | |
|---|---|---|
| EP | 839778 A1 * | 5/1998 |
| KR | 1992-0017801 | 10/1992 |
| KR | 0135439 | 1/1998 |
| KR | 2001-0003718 | 1/2001 |
| KR | 1020050033131 A | 4/2005 |
| RO | 114015 B * | 12/1998 |

* cited by examiner

*Primary Examiner*—Hai Vo
(74) *Attorney, Agent, or Firm*—Cantor Colburn LLP

(57) ABSTRACT

A super lightweight ceramic panel for a non-bearing wall utilizing an expandable clay mineral and a process for preparing the same are provided. The super lightweight ceramic panel is comprised of a clay composition containing 90 to 98% by weight of an expandable clay mineral, 1.5 to 5% by weight of a flux (glass), and 0.5 to 5% by weight of silicon carbide, and is prepared by mixing and pressing the clay composition, followed by firing at a temperature of 1100 to 1200° C. The super lightweight ceramic panel in accordance with the present invention is a material having a light weight and exhibiting improvement in physical properties such as water resistance, flame retardancy, heat insulation and rigidity, via formation of closed pores inside the ceramic material.

12 Claims, 4 Drawing Sheets

SUPER LIGHT WEIGHT CERAMIC PANEL AND PROCESS FOR PREPARING THE SAME

This application claims the benefit of the filing date of Korean Utility Model Application No. 20-2004-0031164 filed on Nov. 4, 2004 in the Korean Intellectual Property Office, the disclosure of which is incorporated herein in its entirety by reference.

TECHNICAL FIELD

The present invention relates to a ceramic panel for use in a non-bearing wall and a process for preparing the same. More specifically, the present invention relates to a super lightweight ceramic panel which has a super light-weight and achieves improvement in physical properties such as water resistance, flame retardancy, heat insulation and rigidity, by taking advantage of foaming properties of a clay mineral and formation of pores inside the panel, and a process for preparing the same.

BACKGROUND ART

Ceramic panels suitable for industrial applications should meet requirements such as convenient and simple constructability upon structural changes of buildings, and should be light weight in compliance with a trend toward scale-up and higher stories of buildings. In addition, panels should have effects such as heat conservation/insulation in order to cut down on consumption of energy, and sound absorption/insulation against a variety of noises due to high densities of buildings in cities.

Conventional autoclaved lightweight concrete (ALC) panels or blocks, domestically produced by some manufacturers, have been partially adopted on construction sites by building companies, but suffer from problems associated with water permeability, incongruence of wiring and piping work and excessive weight, thereby making it difficult to acquire popularity in the related art.

Dry walls, a type of building material which is used by assembling and constructing individual members on construction sites utilizing gypsum boards, glass wool and steel studs, also suffer from disadvantages such as significant error and variation during or after installation, weak impact strength and weak nail-bearing strength, thus resulting in inferior housing quality. Additionally, due to their poor water resistance, water absorption of glass wool resulting from water leakage leads to growth of fungi, thereby failing to acquire popularity and application thereof.

Foam glass, a glass having a pore structure inside thereof, is an amorphous material exhibiting heat insulation and lightweight characteristics due to physical properties of the pore structure in combination with inherent physical properties of glass itself. Foam glass is widely used as a heat-insulating material, a cold-insulating material and a corrosion-resistant material in various applications such as petrochemical plants, bottoms of LNG tanks, freezing warehouses and chimney linings.

In addition to those panel materials as mentioned above, there is an extrusion lightweight aerated concrete panel such as Acotec panel, but such a panel also suffers from disadvantages such as heavy weight and poor processability, thereby resulting in very little application.

Such conventional lightweight panels are susceptible to many problems such as risk of bacterial proliferation in seasons of high-humidity resulting from their high water-permeability, excessive weight and low nail-bearing strength upon installation thereof in large-sized buildings, and poor sound-insulation and flame retardancy characteristics in densely built-up city buildings.

Meanwhile, sandwich panels, in which plate-like materials such as steel plates are attached to both sides of core materials such as heat insulating materials, are used as interior and exterior work materials for buildings such as temporary buildings, non-residential buildings, partition wall structures and exterior wall structures.

Conventional sandwich panels may be broadly divided into an expandable polystyrene panel (EPS), an expanded polyurethane panel, a polyisocyanurate (PIR) panel and a glass wool panel, depending upon species of internal heat-insulating materials.

Among these panels, the EPS panels and expanded polyurethane panels cannot secure fire-resistant performance, and thus cannot be applied to sites which are required to be fireproof. Further, these panels cannot secure incombustibility performance, thereby being applicable to very limited sites and cannot be applied to sites that can be seen from inside, thus limiting practical uses and applications thereof.

The PIR panel exhibits incombustibility performance of flame retardancy grade 3, but is incapable of securing fireresistant performance. Therefore, this panel cannot be applied to sites requiring incombustibility performance of flame retardancy grade higher than 2 or fire-resistant performance, and is also disadvantageously expensive.

The glass fiber panel can ensure fire-resistant performance and thus can be applied to various sites, while exposure of the panel to water cause fatal damage thereof due to its vulnerability to water, thus reducing the functions of the sandwich panel. In addition, due to dust of glass fibers occurring when cutting and installing the panel, there is a disadvantage such as avoidance of construction by workers.

Korean Patent Publication Laid-open No. 1992-0017801 and Korean Patent Registration No. 135439 disclose a sandwich panel comprising a heat-insulating material composed of a foam resin as an intermediate inserting material and a polymer concrete as an exterior wall material. Korean Patent Publication Laid-open No. 2001-0003718 discloses a thin stone sandwich panel for a prefabricated partition manufactured by making a multi- or mono-layer block having a cavity formed inside thereof using a stone plate material, filling the cavity with materials such as concrete waste and then cutting and trimming the stone material, and a boundary stone for sidewalks and roadways. Korean Utility Model Registration No. 344475 discloses a sandwich panel in which an internal space of a hollow hexahedron-shaped sandwich panel skin is filled with lightweight aerated concrete via an injection process. However, such conventional sandwich panels have disadvantages such as heavy weight and poor processability due to the use of concrete or stone materials.

As such, conventional sandwich panels suffer from a variety of problems such as potential risk of bacterial proliferation in seasons of high-humidity due to their high waterpermeability, excessive weight and weak nail-bearing strength upon installation thereof in large-scale buildings, and poor sound insulation and flame retardancy characteristics in densely built-up city buildings.

In order to ensure that sandwich panels are free from many limitations associated with their application, the panels should have incombustibility and fire-resistance performance, and in order to achieve the desired degree of customer satisfaction for products, the panels should provide superior sound insulation, bending strength, impact strength, nailbearing strength, water resistance and durability characteristics.

DISCLOSURE

Technical Problem

Therefore, the present invention has been made in view of the above problems, and it is an object of the present invention to provide a super lightweight ceramic panel which is capable of being used as interior and exterior materials for buildings by improving physical properties such as light-weight, rigidity, water resistance, flame retardancy and heat insulation via formation of closed pore structures, while preserving intrinsic functions of ceramic.

It is another object of the present invention to provide a process for preparing an inorganic material ceramic, made by a high-temperature firing process, in the form of a super lightweight ceramic panel.

It is yet another object of the present invention to provide a sandwich panel which meets all requirements by solving problems exhibited by conventional panels and can thus be widely applied.

Technical Solution

In accordance with an aspect of the present invention, the above and other objects can be accomplished by the provision of a super lightweight ceramic panel comprising a multiplicity of closed pore structures produced by trapping carbon dioxide gas generated via oxidation of silicon carbide and oxygen gas generated via reduction of iron oxide within a vitreous phase produced by an expandable clay mineral and glass.

Herein, preferably a pore density of the closed pore is in a range of 343 to 1000 pores/cm$^3$, and a pore volume thereof is in a range of 74 to 89%, relative to the total volume of the panel.

The ceramic panel in accordance with the present invention is super lightweight and strong, and has superior physical properties such as high water resistance, flame retardancy, heat insulation and far infrared radiation rate, due to the structure and physical properties of the closed pores as described above.

Specifically, the ceramic panel in accordance with the present invention is characterized by having a water permeability of 0 to 5%, a density of 0.3 to 0.7 g/cm$^3$, incombustibility of flame retardancy grade 1 pursuant to KS F 2271, a linear expansion rate of 13.8 to 40.2%, a flexural strength of 8 to 50 kgf/cm$^2$, a far infrared radiation rate of 0.90 to 0.93, a far infrared radiation energy of 350 to 400 W/m$^2$, a thermal conductivity of 0.10 to 0.13 W/m·K, and a bending strength of 40 to 80 kgf/cm$^2$.

The ceramic panel in accordance with the present invention is composed of a composition comprising 90 to 98% by weight of an expandable clay mineral, 1 to 5% by weight of glass as a flux, and 0.5 to 5% by weight of silicon carbide as a foaming agent. Herein, waste glass is preferably used as the flux, in terms of reduction of production costs.

The expandable clay mineral used in the present invention contains 61.5 to 70% by weight of $SiO_2$, 15 to 20% by weight of $Al_2O_3$, 1 to 5% by weight of $Fe_2O_3$, 2 to 4% by weight of CaO, 1 to 3% by weight of MgO, 0.5 to 1.5% by weight of $K_2O$ and 2 to 5% by weight of $Na_2O$.

The ceramic panel in accordance with the present invention can be used as a heat insulating material and core material, and can be applied to a sandwich panel having a sandwich structure, where both top and bottom sides of the ceramic panel are adhered to steel plates. An adhesive used for binding between the ceramic panel and the steel plate is preferably selected from an epoxy adhesive, an urethane adhesive, an ethylene vinyl acetate (EVA) adhesive and any combination thereof.

In the ceramic panel in accordance with the present invention, a protrusion part is formed on one side thereof and a groove part is formed on the opposite side. Thus, it is possible to assemble two adjacent ceramic panels via coupling between the protrusion part and the groove part without a separate assembly member.

In accordance with another aspect of the present invention, there is provided a process for preparing a super lightweight ceramic panel, comprising mixing 90 to 98% by weight of an expandable clay mineral, 1 to 5% by weight of glass as a flux and 0.5 to 5% by weight of silicon carbide as a foaming agent; pressing the resulting mixture into a panel shape; and firing and foaming the molded material.

Firing and foaming steps are preferably carried out at a temperature of 1100 to 1200° C. The above range of firing temperature is most suitable for the clay mineral and formula used in the present invention.

Preferably, a firing time in the firing and foaming steps is in a range of 20 minutes to 24 hours, and a holding time is in a range of 1 min to 1 hour. Most preferably, the firing time is 38 minutes and the holding time is 2 minutes. The hold time is a period of time the temperature conditions are maintained in order to ensure that pores can be uniformly produced well on both internal and external sides of the panel.

Where the firing time and hold time are too short, pores art not sufficiently produced, thus probably increasing specific gravity. In contrast, where the firing time and hold time are too long, the pores formed are large, thus probably reducing specific gravity while weakening impact strength.

The super lightweight ceramic panel, prepared via a high-temperature firing process according to the present invention, is made up of an inorganic material ceramic, and thus is useful as interior/exterior materials in a building material industry by having physical properties such as light-weight, water resistance, flame retardancy, heat insulation, rigidity and sound insulation due to closed pore structures, while maintaining intrinsic functions of ceramic itself. In addition, due to use of natural clay minerals which are inexpensive natural resources, the ceramic panel of the present invention is a new wall material which is highly economical and environmentally friendly.

Further, the super lightweight ceramic panel of the present invention is an inorganic material satisfying incombustibility and fire resistance performance, and thus it is possible to provide a lightweight sandwich panel having equally combined performance of incombustibility, fire resistance, water resistance, sound insulation, bending strength, impact strength, nail-bearing strength, durability, lightweight and heat insulation performance, by using the panel as an internal heat-insulating material and attaching steel plates to both sides thereof, thereby fabricating a desired product.

Due to very lightweight and incombustibility properties of ceramic, the ceramic panel in accordance with the present invention is very suitable as a heat insulating material and core material for the sandwich panels. The ceramic panel in accordance with the present invention is highly economical due to a reduction of raw material costs and energy costs by using and foaming a small amount of raw materials, and is also environmentally friendly due to use of natural materials.

DESCRIPTION OF THE DRAWINGS

The above and other objects, features and other advantages of the present invention will be more clearly understood from the following detailed description taken in conjunction with the accompanying drawings, in which.

BEST MODE

Hereinafter, the present invention will be described in more detail with reference to the accompanying drawing.

Figure 1:
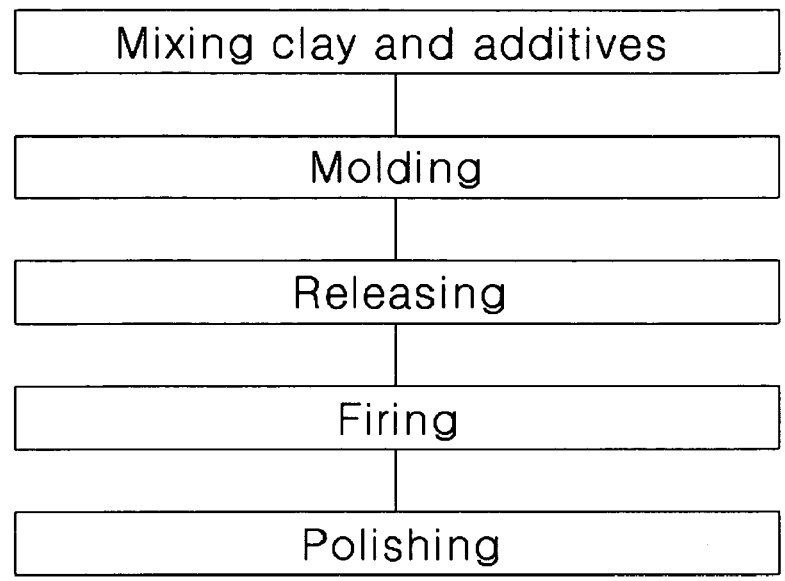
FIG. 1 is a flow chart for preparing a super lightweight ceramic panel in accordance with the present invention.

FIG. 1 is a process flow chart for preparing a super lightweight ceramic panel in accordance with the present invention, wherein the process is generally composed of a clay-additive mixing, molding, releasing, firing and polishing process.

Specifically, the manufacturing process includes:

mixing 90 to 98% by weight of an expandable clay mineral, 1 to 5% by weight of glass and 0.5 to 5% by weight of silicon carbide (step A);

drying the resulting mixed powder and subjecting the dried mixture to uniaxial pressing in a mold to prepare a molded material in the form of a panel (step B);

releasing the molded material from the mold (step C);

firing and foaming the molded material in a tunnel kiln or a shuttle kiln at a temperature of 1,100 to 1,200° C., followed by natural cooling (step D); and polishing the surface of the fired material (step E).

The ceramic panel in accordance with the present invention is characterized by use of the clay mineral having foaming properties, and thus the key point associated with preparation of the panel is to effectively and economically control the degree of foaming of the expandable clay mineral.

Requirements to control the degree of foaming of the expandable clay mineral can be broadly classified into three key points as follows: development of an optimal composition range between the clay mineral having foaming properties, a foaming agent (silicon carbide) and a flux (glass), finding a firing and hold time ranges for optimal foaming and firing conditions, and finally, establishment of a production process technology of foamed lightweight ceramic.

The ceramic panel in accordance with the present invention comprises 90 to 98% by weight of an expandable clay mineral, 1 to 5% by weight of glass as a flux and 0.5 to 5% by weight of silicon carbide as a foaming agent, wherein the expandable clay mineral contains 61.5 to 70% by weight of $SiO_2$, 15 to 20% by weight of $Al_2O_3$, 1 to 5% by weight of $Fe_2O_3$, 2 to 4% by weight of CaO, 1 to 3% by weight of MgO, 0.5 to 1.5% by weight of $K_2O$, 2 to 5% by weight of $Na_2O$ and other organic materials.

When contents of the expandable clay mineral, glass and silicon carbide constituting inorganic minerals in the composition are within the above range, it is possible to prepare a ceramic panel suitable for the purpose of the present invention. Specific reasons will be described as follows.

As the content of the expandable clay mineral is increased, foaming properties of the super lightweight ceramic panel are deteriorated while strength thereof is increased. In addition, as the content of the expandable clay mineral is decreased, foaming properties of the super lightweight ceramic panel are improved while strength thereof is decreased. Therefore, it is suitable that the content of the expandable clay mineral in the composition is in a range of 90 to 98% by weight.

The glass affects the composition and properties of the super lightweight ceramic panel. Glass forms a vitreous phase at a low temperature upon firing, and confines evolved gas ($CO_2$) inside the ceramic panel, thereby creating closed pore structures. However, addition of an excessive amount of glass may result in reduced density, and thus the content of glass is preferably in a range of 1 to 5% by weight.

Silicon carbide generates gas within the vitreous phase formed by glass which is used as a flux, thereby resulting in formation of closed pore structures. Addition of an excessive amount of silicon carbide leads to production of a large amount of gas which in turn lowers density thereof, as it results in opening of closed pores which in turn causes gas to be ejected to the outside, thus lowering the strength of the super lightweight ceramic panel. Therefore, the content of silicon carbide is preferably in a range of 0.5 to 5% by weight.

Figure 2:
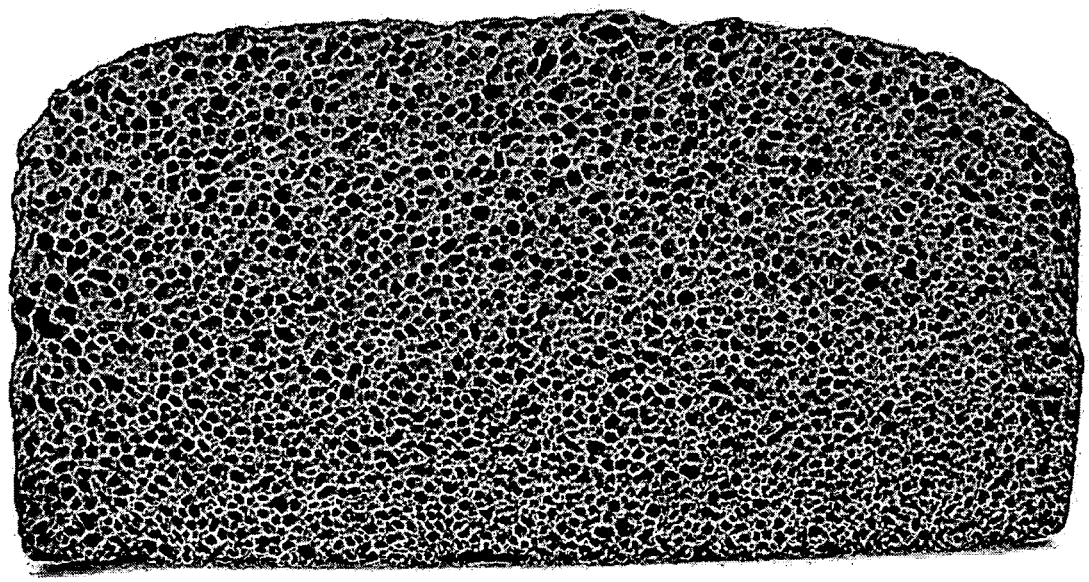
FIG. 2 is a photograph showing a sample of a super lightweight ceramic panel prepared in accordance with one embodiment of the present invention.

FIG. 2 is a photograph showing a sample of a super lightweight ceramic panel prepared in accordance with one embodiment of the present invention, and it can be confirmed that the super lightweight ceramic panel includes closed pore structures produced by trapping carbon dioxide gas generated via oxidation of silicon carbide and oxygen gas generated via reduction of iron oxide within a vitreous phase produced by the expandable clay mineral and glass.

Hereinafter, the principle of formation of the closed pore structure will be briefly described.

When the expandable clay mineral, glass and silicon carbide are mixed, molded and fired, vitreous and crystalline materials are formed. Then, gases are generated from oxidation of silicon carbide at a high temperature, as shown in the following reaction 1 and from reduction of $Fe_2O_3$, as shown in the following reaction 2, thereby leading to formation of closed pore structures within the vitreous phase:

$$SiC + 2O_2 = SiO_2 + CO_2\uparrow \qquad \text{[Reaction 1]}$$

$$Fe_2O_3 = 2FeO + \tfrac{1}{2}O_2\uparrow \qquad \text{[Reaction 2]}$$

Figure 3:
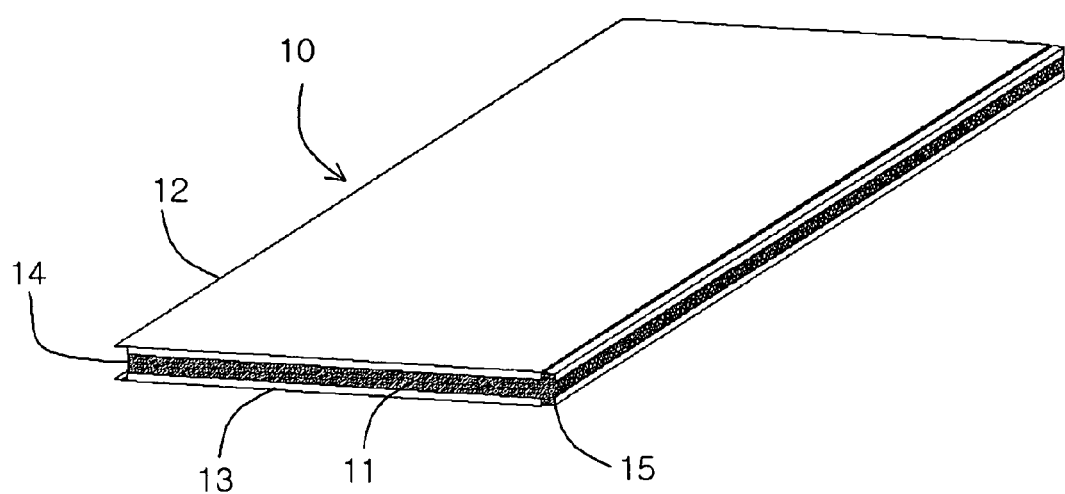
FIG. 3 is a perspective view of a sandwich panel to which a super lightweight ceramic panel in accordance with the present invention is applied.
Figure 4:
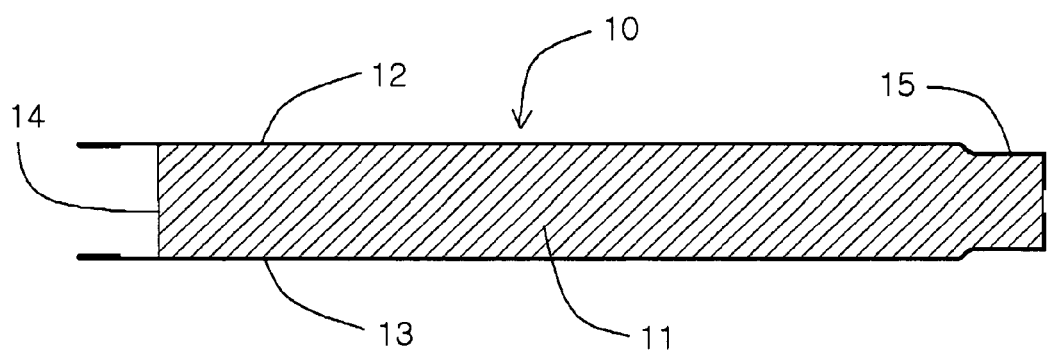
FIG. 4 is a cross-sectional view of a sandwich panel to which a super lightweight ceramic panel in accordance with the present invention is applied.

FIGS. 3 and 4 are, respectively, perspective and cross-sectional views of a sandwich panel to which a super lightweight ceramic panel in accordance with the present invention is applied. Herein, the sandwich panel 10 in accordance with the present invention is a panel in which an inorganic material-based super lightweight ceramic panel 11 having fire resistance, incombustibility, water resistance, lightweight, heat insulation and sound insulation characteristics is used as a heat insulating material and core material, and two top and bottom steel plates 12 and 13 are integrally attached to both top and bottom sides of the ceramic panel 11 using an adhesive.

Examples of steel plates 12 and 13 that can be used herein include a zinc-plated steel plate, a polyester-coated steel plate, a silicon/polyester-coated steel plate, a fluorine-coated steel plate, an aluminum sheet (that can be coated with fluorine) and a steel use stainless (SUS) sheet (that can be subjected to various surface treatments such as Dull Finish, Hair Line, Mirror, etc.).

Figure 5:
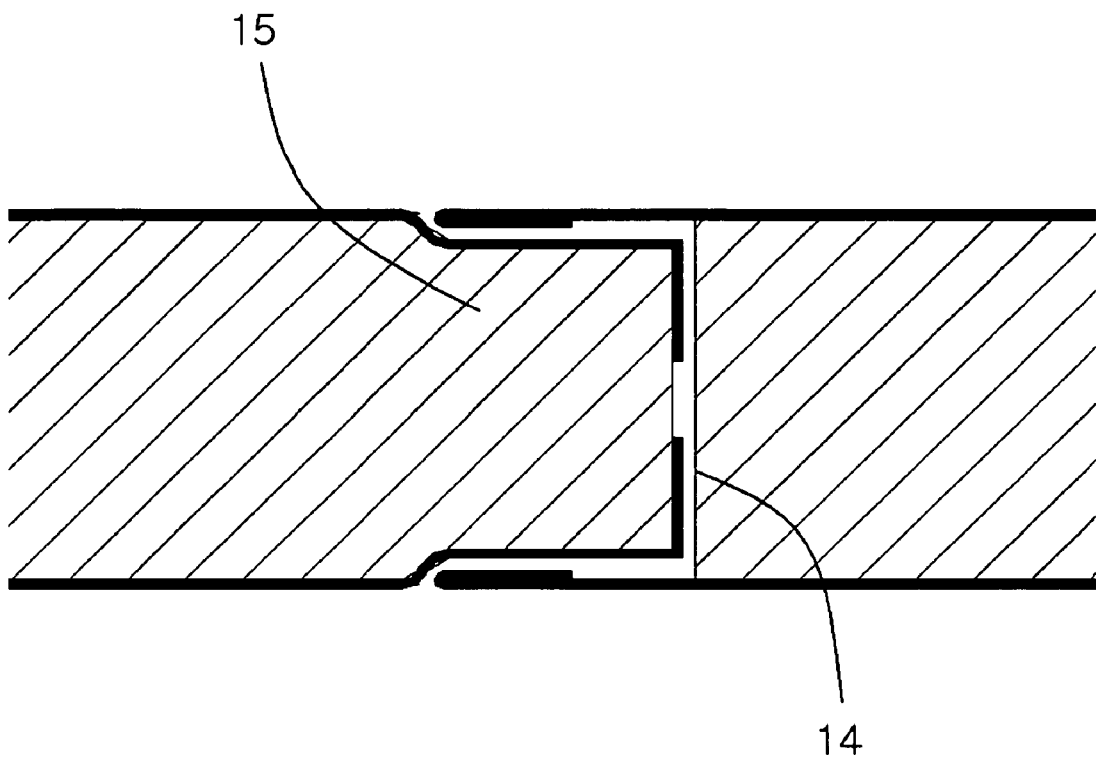
FIG. 5 is a cross-sectional view showing coupling between joint parts of a sandwich panel to which a super lightweight ceramic panel in accordance with the present invention is applied.

FIG. 5 is a cross-sectional view showing coupling between joint parts of a sandwich panel to which a super lightweight ceramic panel in accordance with the present invention is applied. Herein, sides of the steel plates 12 and 13 used as finish materials are cut and bent to have a shape capable of serving as the finish material and at the same time, performing a function of a joint member for assembly. That is, a protrusion part 15 is formed on one side of the sandwich panel 10 in accordance with the present invention, and a groove part 14 is formed on the opposite side, by which assembly of panels can be achieved by inter-fitting of panels 10 alone without the use of a separate assembly member.

Figure 6:
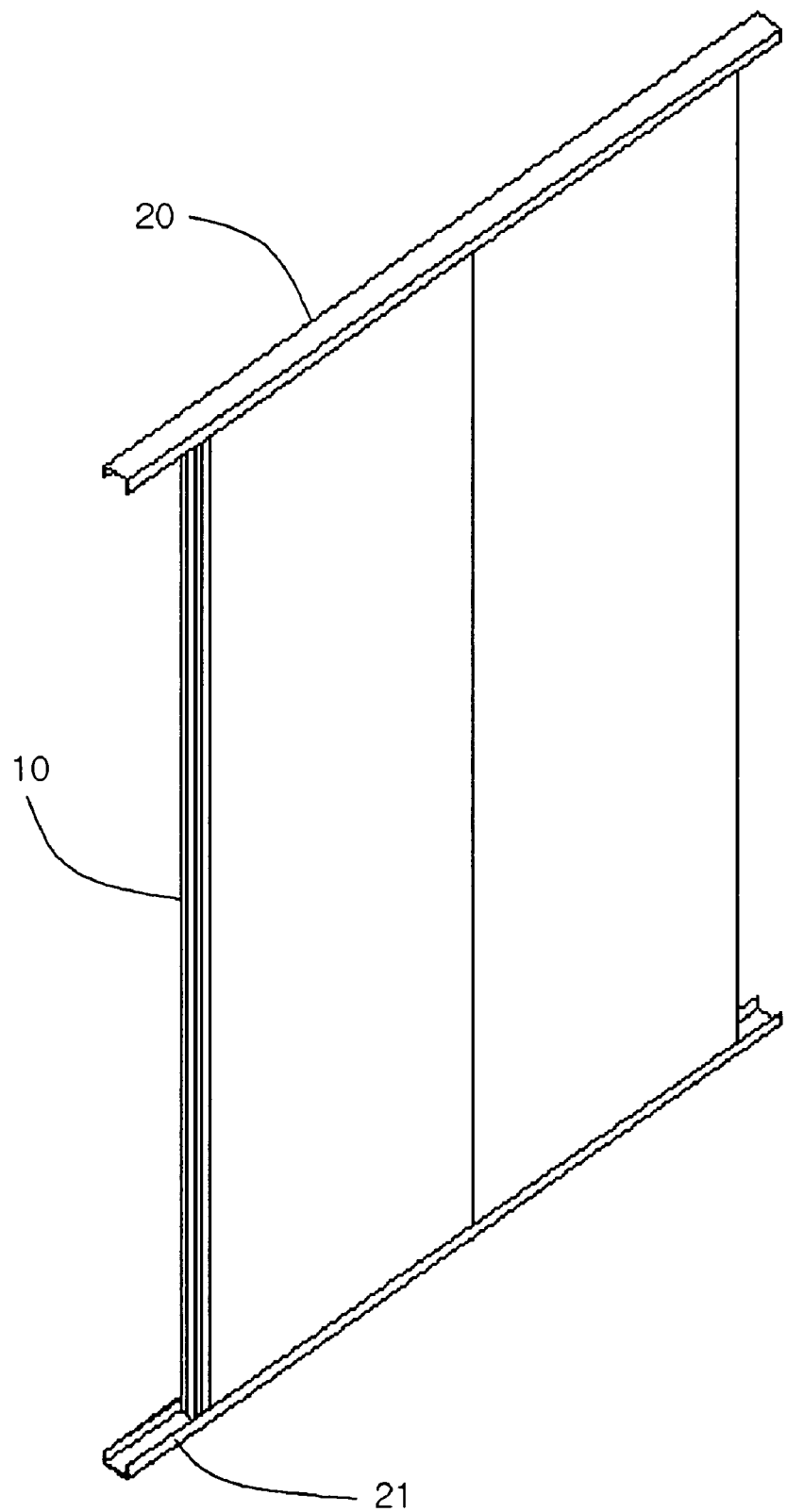
FIG. 6 is a schematic view showing installation of a sandwich panel to which a super lightweight ceramic panel in accordance with the present invention is applied.

FIG. 6 is a view schematically showing installation of a sandwich panel to which a super lightweight ceramic panel in accordance with the present invention is applied, wherein the sandwich panel 10 of the present invention is mounted on top and bottom runners 20 and 21. This method is a conventional installation manner of the sandwich panels, wherein the top and bottom runners 20 and 21 serve to support and fix the panels 10, and secure air tightness and sound insulation. As an accurate position at which the panels 10 will be built is secured using the top and bottom runners 20 and 21 and the panels 10 are slid on the runners 20 and 21 to be installed, it is possible to achieve convenient construction.

MODE FOR INVENTION

Examples

Hereinafter, an example of a process for preparing a super lightweight ceramic panel in accordance with the present invention will be described, and features and other advantages of the present invention will be more clearly understood from the following examples. These examples are provided only for illustrating the present invention and should not be construed as limiting the scope and spirit of the present invention.

Example 1

100% by weight of inorganic minerals composed of 96.0% by weight of an expandable clay mineral containing 65% by weight of $SiO_2$, 15% by weight of $Al_2O_3$, 2% by weight of $Fe_2O_3$, 4% by weight of CaO, 3% by weight of MgO, 1.5% by weight of $K_2O$, 2.5% by weight of $Na_2O$ and 7% by weight of other organic materials, 3% by weight of waste glass and 1% by weight of silicon carbide were mixed for 12 hours, placed into a mold having a diameter of 36 mm and subjected to uniaxial pressing under a pressure of 100 kgf/cm$^2$. After being released from the mold, the molded material was subjected to oxidation firing and foaming in an electric furnace at a temperature of 1140° C., followed by natural cooling. Finally, a surface of the fired material was polished, thereby preparing a super lightweight ceramic panel.

Example 2

A super lightweight ceramic panel was prepared in the same manner as in Example 1, except that a firing temperature was set to 1170° C.

Example 3

A super lightweight ceramic panel was prepared in the same manner as in Example 1, except that a firing temperature was set to 1200° C.

Experimental Example 1

An expansion rate, density and flexural strength were measured on super lightweight ceramic panels prepared in Examples 1 through 3. The results thus obtained are shown in Table 1 below.

TABLE 1

| | Example 1 (Firing Temp. 1140° C.) | Example 2 (Firing Temp. 1170° C.) | Example 3 (Firing Temp. 1200° C.) |
| --- | --- | --- | --- |
| Linear expansion rate (%) | 23.9 | 31.0 | 27.7 |
| Density (g/cm$^3$) | 0.70 | 0.50 | 0.30 |
| Flexural strength (kgf/cm$^2$) | 40 | 19 | 8 |

Example 4

A super lightweight ceramic panel was prepared in the same manner as in Example 1, except that a composition of an inorganic mineral was rendered to contain 96.5% by weight of an expandable clay mineral and 0.5% by weight of silicon carbide and a firing temperature was set to 1170° C.

Example 5

A super lightweight ceramic panel was prepared in the same manner as in Example 4, except that a composition of an inorganic mineral was rendered to contain 96.0% by weight of an expandable clay mineral and 1.0% by weight of silicon carbide.

Example 6

A super lightweight ceramic panel was prepared in the same manner as in Example 4, except that a composition of an inorganic mineral was rendered to contain 95.5% by weight of an expandable clay mineral and 1.5% by weight of silicon carbide.

Experimental Example 2

An expansion rate, density and flexural strength were measured on super lightweight ceramic panels prepared in Examples 4 through 6. The results thus obtained are shown in Table 2 below.

TABLE 2

| | Example 4 (Silicon carbide 0.5%) | Example 5 (Silicon carbide 1.0%) | Example 6 (Silicon carbide 1.5%) |
| --- | --- | --- | --- |
| Linear expansion rate (%) | 13.8 | 30.9 | 40.2 |
| Density (g/cm$^3$) | 0.60 | 0.50 | 0.30 |
| Flexural strength (kgf/cm$^2$) | 50 | 19 | 10 |

Experimental Example 3

Flame retardancy, thermal conductivity, water permeability, bending strength and far infrared radiation rate were measured on a super lightweight ceramic panel prepared in Example 1. The results thus obtained are shown in Table 3 below.

TABLE 3

| Physical properties | Performance | Test method |
| --- | --- | --- |
| Flame retardancy | Flame retardancy grade 1 | KS F 2271 |
| Thermal conductivity (W/m · K) | 0.128 | KS L 9016 |
| Water permeability (%) | 3.2 | 24 h submerged |
| Bending strength (kgf/cm$^2$) | 60 | KS F 2407 |
| Far infrared radiation rate (5-20 μm) | 0.922 | FT-IR |
| Far infrared radiation energy (W/m$^2$) | 371.8 | FT-IR |

As can be confirmed from Tables 1 through 3, the ceramic panel in accordance with the present invention is super lightweight while exhibiting excellent strength, and has superior physical properties such as high water resistance, flame retardancy, heat insulation and far infrared radiation rate.

Example 7

A sandwich panel 10 having a structure as shown in FIG. 3 was prepared by using a super lightweight ceramic panel 11 prepared in Example 1 as a heat insulating material and core material, integrally attaching two steel plates 12 and 13 to both top and bottom sides of the ceramic panel 11 using an adhesive, and then forming a protrusion part 15 and a groove part 14 at both sides of the panel for assembly between panels.

INDUSTRIAL APPLICABILITY

The super lightweight ceramic panel in accordance with the present invention is useful as interior/exterior building materials in a building material industry by having physical properties such as light-weight, water resistance, flame retardancy, heat insulation, rigidity and sound insulation via formation of closed pore structures, while preserving intrinsic functions of ceramic itself. In addition, the ceramic panel of the present invention is highly economical due to reduction of raw material costs and energy costs resulting from use of natural clay minerals which are inexpensive domestic natural resources, and is also environmentally friendly due to use of natural materials.

Further, the ceramic panel of the present invention ensures incombustibility and fire resistance performance and safety to workers and users, and can thus be used on any site without limitations. In addition, the ceramic panel of the present invention is composed of closed cells thus leading to very low water permeability which in turn provides good water resistance. Additionally, when it is applied as a heat insulating material and core material of the sandwich panel, the ceramic panel is integrated with a steel plate and therefore exerts high rigidity which in turn provides excellent bending strength, impact resistance, durability and nail-bearing strength, and as a result, the degree of customer satisfaction for the product is enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A super light weight ceramic panel comprising a multiplicity of closed pore structures produced by trapping carbon dioxide gas generated via oxidation of silicon carbide and oxygen gas generated via reduction of iron oxide within a vitreous phase produced by expandable clay mineral and glass,
    wherein the ceramic panel, is made of a composition, consisting of 90 to 98% by weight of an expandable clay mineral, 1 to 5% by weight of glass, and 1 to 5% by weight of silicon carbide, and
    wherein the expandable clay mineral consists of 61.5 to 70% by weight of $SiO_2$, 15 to 20% by weight of $Al_2O_3$, 1 to 5% by weight of $Fe_2O_3$, 2 to 4% by weight of CaO, 1 to 3% by weight of MgO, 0.5 to 1.5% by weight of $K_2O$ and 2 to 5% by weight of $Na_2O$,
    wherein the closed pore has a pore density of 343 to 1000 pores/cm$^3$, and
    wherein the closed pore has a pore volume of 74 to 89%, relative to the total volume of the panel.

2. The panel according to claim 1, wherein the ceramic panel has a water permeability of 0 to 5%.

3. The panel according to claim 1, wherein the ceramic panel has a density of 0.3 to 0.7 g/cm$^3$.

4. The panel according to claim 1, wherein the ceramic panel has flame retardancy grade 1 pursuant to KS F 2271.

5. The panel according to claim 1, wherein the ceramic panel has a linear expansion rate of 13.8 to 40.2%.

6. The panel according to claim 1, wherein the ceramic panel has a flexural strength of 8 to 50 kgf/cm$^2$.

7. The panel according to claim 1, wherein the ceramic panel has a far infrared radiation rate of 0.90 to 0.93 and a far infrared radiation energy of 350 to 400 W/m$^2$.

8. The panel according to claim 1, wherein the ceramic panel has a thermal conductivity of 0.10 to 0.13 W/m·K.

9. The panel according to claim 1, wherein the ceramic panel has a bending strength of 40 to 80 kgf/cm$^2$.

10. The panel according to claim 1, wherein the panel has a sandwich structure by attaching steel plates to both top and bottom sides of the ceramic panel.

11. The panel according to claim 1, wherein an adhesive used in adhesion between the ceramic panel and the steel plate is selected from an epoxy adhesive, an urethane adhesive, an ethylene vinyl acetate (EVA) adhesive and mixtures thereof.

12. The panel according to claim 1, wherein a protrusion is formed on one side of the ceramic panel and a groove is formed on the opposite side thereof and two adjacent ceramic panels are assembled via coupling between the protrusion and the groove.

* * * * *